Feb. 14, 1956 E. RING ET AL 2,734,275

THICKNESS GAGE

Filed June 6, 1952

INVENTORS
Elliot Ring
Charles E. Lorman

BY G. J. Kessenich & A. W. Dew
ATTORNEYS

United States Patent Office 2,734,275
Patented Feb. 14, 1956

2,734,275

THICKNESS GAGE

Elliot Ring, Schenectady, and Charles E. Lorman, Saratoga Springs, N. Y., assignors to the United States of America as represented by the Secretary of the Army Application June 6, 1952, Serial No. 292,147

12 Claims. (Cl. 33—147)

This invention relates to a thickness gage and the primary object of the invention is to provide a gage adapted for measuring wall thickness of irregularly shaped long hollow bodies. In order to measure such bodies it has frequently been necessary to have a special gage made for each new contour and the instant invention seeks to obviate this necessity.

A corollary object is to provide a thickness gage wherein a dial indicator can be adjusted in a preselected position, so that its plunger is normal to that portion of the work surface being measured. This adjustability of the indicator, allowing the angle thereof to be also altered with respect to the indicator supporting arm, makes it possible to measure the thickness of relatively sharply inclined wall portions.

Another object is to provide a thickness gage involving a dial indicator wherein the plunger is retractable by remote control so that excessive wear on the work contacting surface of the plunger is prevented, the operator being enabled to retract the plunger during application of the gage to the work and withdrawal of the gage.

Another object of the invention is to provide for said remotely controlled plunger retraction without interference with full adjustability of the dial indicator.

Still another object is to provide for axial as well as angular adjustment of the indicator and for easy securement of the indicator in adjusted position.

The last object to be mentioned specifically is to provide a gage which is economical and practicable to manufacture, capable of being made light in weight and yet sufficiently sturdy to be durable, and accurate as well as generally efficient in use.

The invention is illustrated in the drawing, in which.

Similar characters of reference indicate similar or identical elements and portions throughout the different views.

Figure 1:
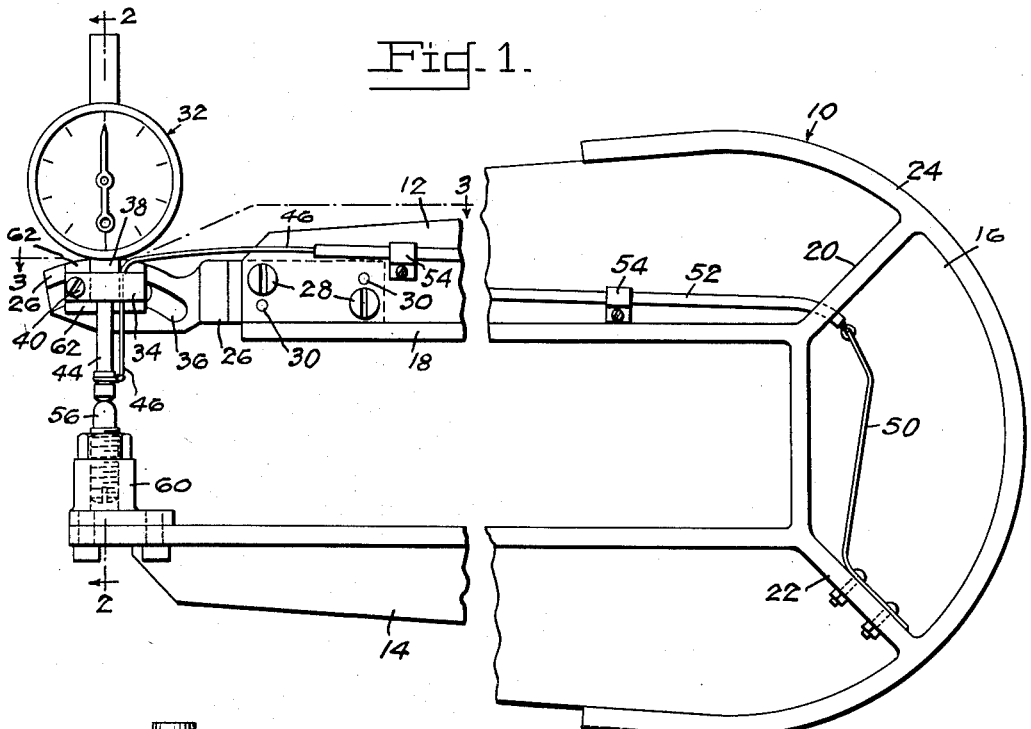
Figure 1 is a side elevational view of the assembled gage, the gage being broken to conserve drawing space.

Referring now to the drawing in detail, the U-shaped frame which is generally indicated by the numeral 10 is comprised of substantially parallel arms 12 and 14 and a bight portion 16 all of plate form with suitable integral reinforcing ribs as indicated at 18, 20, 22 and 24.

The arm 12 is provided with an offset extension member 26 secured in place by screws 28 and dowels 30. The dial indicator generally indicated at 32 is secured to and carried by a shoe 34 and the shoe is slidably adjustably mounted in an arcuate channel 36 in the above mentioned extension member 26. As represented, the plunger guide 38 of the dial indicator is clamped in the shoe 34 which is split and provided with a clamping screw 40. Another clamping screw 42 is used to clamp the shoe 34 in adjusted position on the extension member 26. (See Fig. 2.)

The indicator plunger 44 has one end of a flexible cable 46 secured terminally thereto and extending through a slot 48 in the shoe 34 to be secured at its other end to one end of a flat spring 50, the other end of the spring being mounted on the rib 22 in such manner that the cable 46 is constantly tensioned but the effect of the spring 50 is normally overcome by a spring, not shown, always incorporated in the dial indicator 32, so that the plunger 44 is properly urged into contact with the work until such time as the spring 50 is manually shifted. A guide tube 52 is clipped as shown at 54 to the frame and this guide tube receives an intermediate portion of the cable 46.

Figure 2:
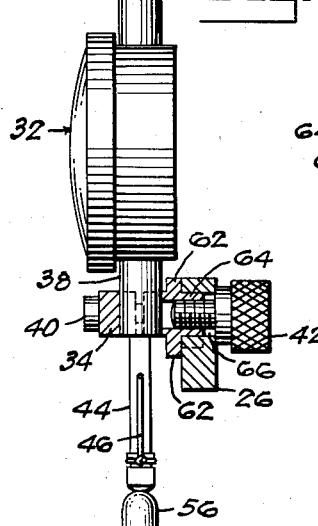
Figure 2 is a vertical cross-section taken substantially on line 2—2 in Figure 1 and showing the indicator and plunger retracting cable in elevation.
Figure 3:
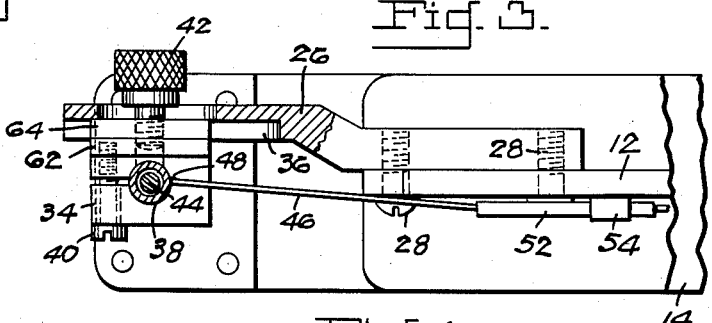
Figure 3 is a fragmentary plan view taken on the line 3—3 in Figure 1 with portions broken away and the underlying parts shown in horizontal cross-section.
Figure 4:
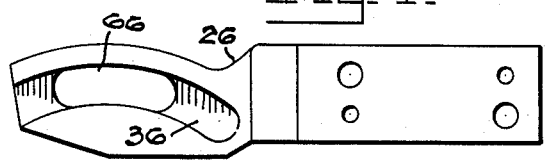
Figure 4 is a side elevational view of the frame extension member.
Figure 5:
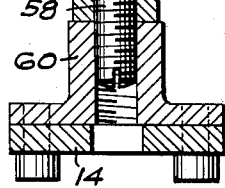
Figure 5 is a view, in perspective, of the shoe used to carry the indicator.
Figure 5:
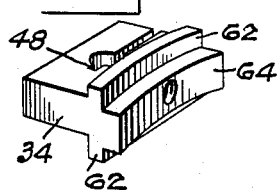

The anvil 56 is rounded or ball pointed and has a threaded shank 58 in a collar 60, whereby the anvil is mounted on the arm 14 and made adjustable for wear as required during use of the tool and for recalibrating center of the sphere in exact center of radius of arcuate channel 36 if arms of gage 14, 12 are varied for any reason. As best shown in Figure 5, the shoe 34 has lateral shoulders 62 which slidably engage one side of the extension member 26, while the arcuate guiding boss 64 slides in the channel 36 as best illustrated in Figure 2. Clamping screw 42 passes through slot 66 in the bottom of the channel so that a substantial range of angular adjustment of the shoe is available.

The operation of this invention will be clearly comprehended from a consideration of the foregoing description of the mechanical structure of the device. In recapitulation, however, it may be added that the plunger 44 is retracted by manually pressing the spring 50 in one direction and the gage can then be placed on the work without danger of damaging it. Similarly retraction of the plunger is required when the gage is being withdrawn from the work. Angular adjustment of the indicator is, of course, accomplished manually after loosening the clamping screw 42 so that the shoe 34 can slide along the arcuate slot 36. Ordinarily the operator will adjust the shoe 26 so that the plunger 44 is normal to the surface of the plate or wall being measured. The indicator can also be adjusted axially of the plunger 44. Further description would appear to be unnecessary.

We claim:

1. A thickness gage comprising an elongated U-shaped frame having substantially coextensive arms, there being an arcuate slot formed adjacent the end of one arm, a shoe slidably mounted in said slot, a dial indicator carried by said shoe and having a work-contacting plunger extending toward the other arm, an anvil on said other arm in opposing relation to said plunger, a plunger retracting means comprising a cable secured at one end to said plunger, and a spring mounted on said frame and operably connected to the other end of said cable to tension said cable, said shoe comprising a guide for an intermediate portion of the cable.

2. A thickness gage comprising an elongated U-frame having substantially coextensive arms, there being an arcuate slot formed adjacent the end of one arm, a shoe slidably mounted on said slot, a dial indicator carried by said shoe and having a yielding work-contacting plunger extending toward the other arm, an anvil on said other arm in opposing relation to said plunger, and means on said frame adjustable to secure said shoe in a pre-selected position in said slot.

3. A gage according to claim 2 including means on said frame operably connected to said plunger for retracting the same from work-contacting position.

4. A gage according to claim 3 wherein said plunger-retracting means comprises a cable having one end secured to said plunger, a flat spring having one end secured to said frame and the other end secured to the free end of said cable, said shoe comprising a guide for an intermediate portion of said cable.

5. A thickness gage comprising an elongated U-shaped frame, having substantially coextensive arms, there being an arcuate slot formed adjacent the end of one arm, a shoe slidably mounted in said slot, means on said frame adjustable to secure said shoe in a pre-selected position in said slot, a substantially vertically disposed sleeve carried by said shoe, a dial indicator secured to and overlying said sleeve, a yielding work-contacting plunger reciprocable in said sleeve, said plunger having one end operably connected to said dial indicator and the other end extending toward said other arm, and an anvil on said other arm in opposing relation to said plunger.

6. A gage according to claim 5 including means on said frame operably connected to said plunger for retracting the same from work-contacting position.

7. A gage according to claim 6 wherein said plunger-retracting means comprises a cable having one end secured to said plunger, a flat spring having one end secured to said frame and the other end secured to the free end of said cable, said shoe comprising a guide for an intermediate portion of said cable.

8. In a gage for measuring the spot thickness of plate material undular in cross-section, a U-shaped frame having parallel legs for extending over and under said plate, an anvil fixed to one of said legs for contacting one surface of said plate, there being an arcuate slot formed in the other of said legs, a yielding work engaging plunger for contacting the other surface of said plate, and means slidable in said slot and mounting said plunger for movement therewith, said last named means being adjustable to place said plunger into a preselected position in said slot normal to its corresponding contacted plate surface.

9. The gage as set forth in claim 8 including means mounted on said frame and secured to said plunger, said last named means being actuable to withdraw said plunger from plate contacting position.

10. The gage as set forth in claim 8 including indicating means actuable by said plunger to give visual measurement of the thickness of said plate.

11. The gage as set forth in claim 8 including means mounted on said frame and secured to said plunger, said last named means being manipulable to withdraw said plunger from plate contacting position, and indicating means actuable by said plunger to give visual measurement of the thickness of said plate.

12. In a gage for measuring the spot thickness of plate material undular in cross-section, a U-shaped frame having parallel legs for extending over and under said plate, an anvil fixed to one of said legs for contacting one surface of said plate, there being an arcuate slot formed in the other of said legs, a plunger for contacting the other surface of said plate, means slidable in said slot and mounting said plunger for movement therewith, said last named means being adjustable to place said plunger into a preselected position normal to its corresponding contacted surface, means on said plunger resiliently biasing the same into plate contacting position, indicating means actuable by said plunger to give visual measurement of the thickness of said plate, and means on said frame engaging said plunger and actuable to withdraw the same against the bias of said resilient means.

References Cited in the file of this patent
UNITED STATES PATENTS

| | | |
|---|---|---|
| 1,341,935 | Schustarich | June 1, 1920 |
| 1,671,737 | Norton | May 29, 1928 |
| 2,051,357 | Zenke | Aug. 18, 1936 |
| 2,051,636 | Gastrich | Aug. 18, 1936 |
| 2,461,148 | Dawley | Feb. 8, 1949 |